J. PARKER.
SPINDLE MOUNTING.
APPLICATION FILED JULY 1, 1910.
1,119,311.
Patented Dec. 1, 1914.
2 SHEETS—SHEET 1.
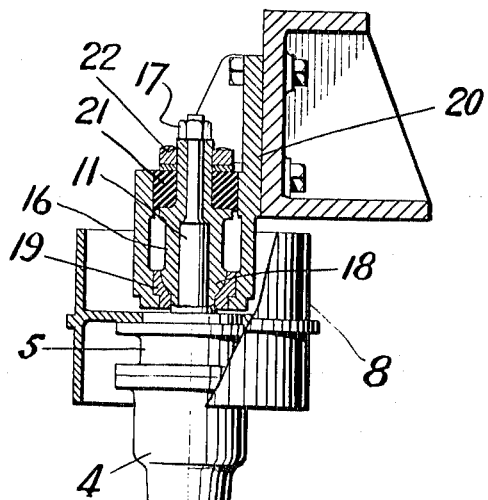
FIG. 1.
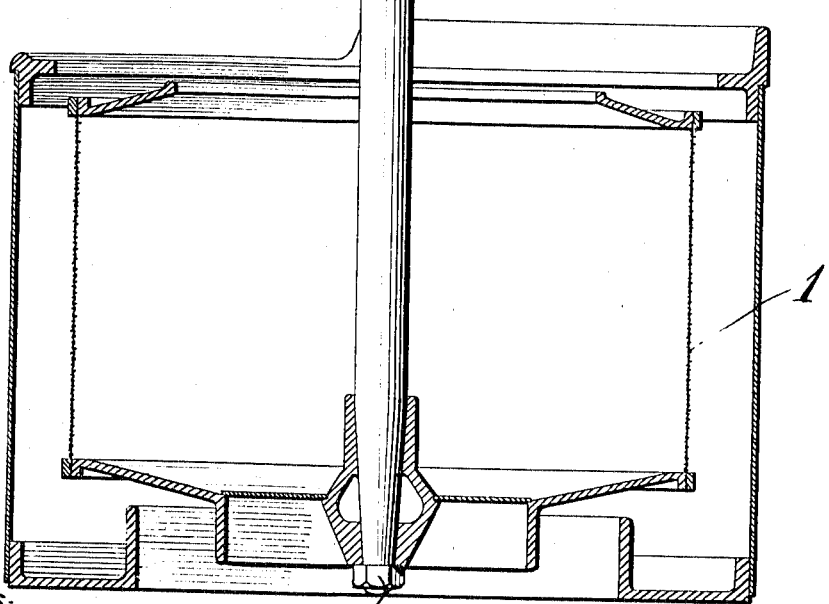
WITNESSES:
INVENTOR
John Parker
BY
Augustus B Stoughton
ATTORNEY.

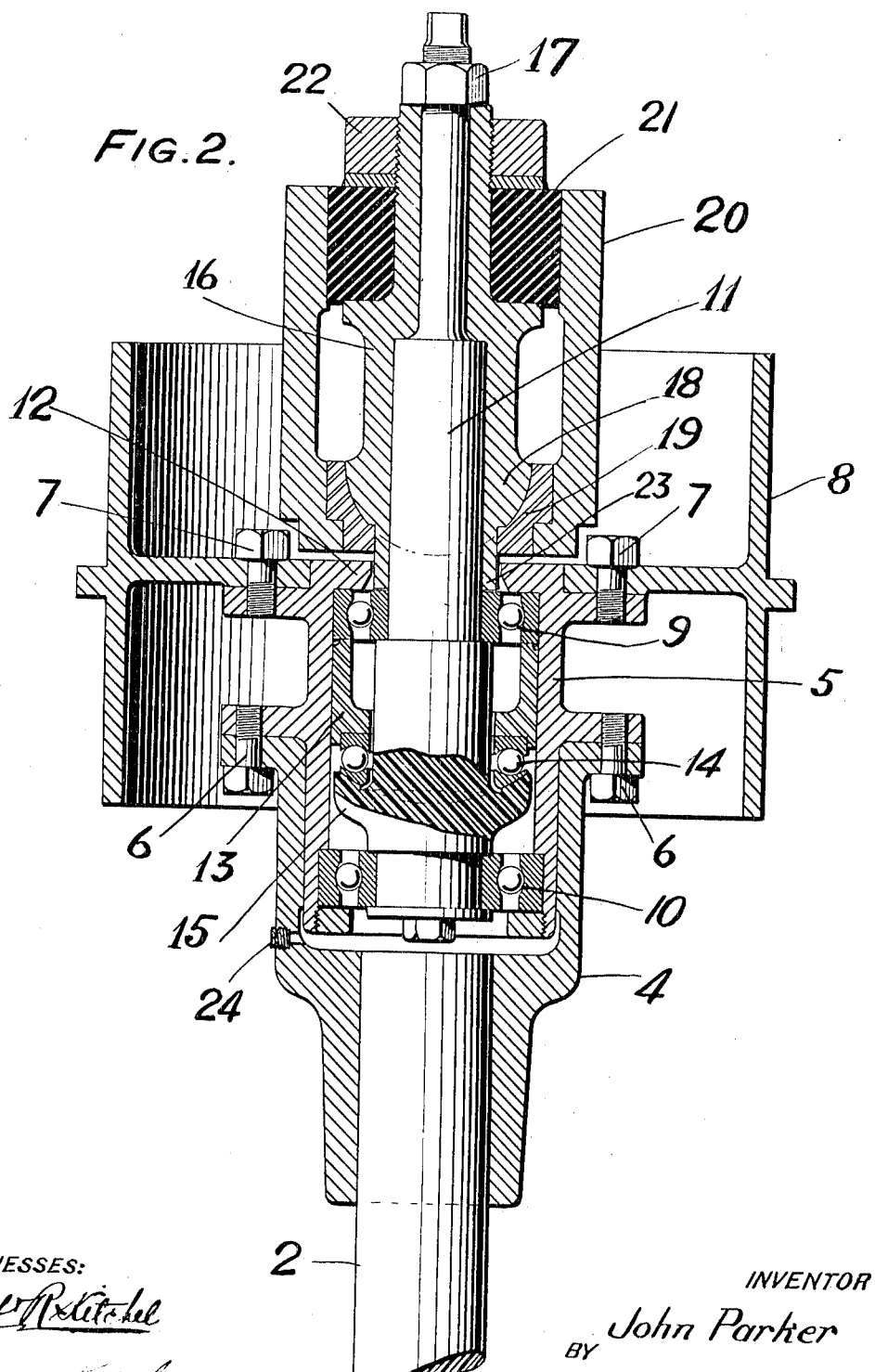

UNITED STATES PATENT OFFICE.

JOHN PARKER, OF PHILADELPHIA, PENNSYLVANIA.

SPINDLE-MOUNTING.

1,119,311.   Specification of Letters Patent.   Patented Dec. 1, 1914.

Application filed July 1, 1910. Serial No. 569,859.

*To all whom it may concern:*

Be it known that I, JOHN PARKER, a subject of the King of England, and a resident of Philadelphia, in the county of Philadelphia, State of Pennsylvania, United States of America, have invented certain new and useful Improvements in Spindle-Mountings, of which the following is a specification.

My invention relates to centrifugal separating machines of the suspended, solid spindle type, and the principal objects of the invention are to constantly lubricate the ball or roller bearings; to exclude dust and dirt from the latter; to protect the gum bushing from any possible contact with oil which is a frequent cause of the rotting of the rubber, and to provide a durable and satisfactorily operating centrifugal separating machine.

The invention will be claimed at the end hereof, but will first be described in connection with the embodiment, but not the only embodiment of it, selected for illustration in the accompanying drawings, in which—

Figure 1, is an elevational view, partly in section, of a centrifugal separating machine embodying features of the invention, and Fig. 2, is a sectional view, drawn to an enlarged scale, of the upper portion of the machine shown in Fig. 1 and illustrating more particularly the invention.

The machine consists of a drum or basket 1 adapted for receiving the material to be purged, said basket being secured to the lower end of a rotating depending shaft or spindle 2 by the nut 3, or in any other suitable manner. The upper end of said spindle is provided with a cup-like enlargement 4, securely attached to or integral therewith and flanged for connection to a sleeve 5 by the bolts 6 and to this sleeve is secured by the bolts 7, a driving pulley 8, by which the rotation of the machine is effected. The sleeve 5 and the cup-like enlargement 4 taken together constitute an oil chamber, casing or receptacle.

Within the sleeve 5 at or near the top and bottom of the same are inserted and securely held against independent rotation the outer races of the annular ball bearings 9 and 10, the inner races of which are sleeved on a stationary spindle 11, as shown. The weight of the machine and its load is transmitted by the end flange 12 of the sleeve 5 through the outer race of the ball bearing 9 and the separator 13 to the step bearing 14, the lower or stationary race of which rests on a collar 15 of the spindle 11. The said spindle passes upward through a collar or sleeve 16 and is secured thereto by a nut 17 and is provided with a spherical projection 18 adapted to a corresponding seat 19 of the suspension bracket or hanger 20, thus forming a ball and socket joint for the support of the machine and permitting an oscillation of the spindle and its bearings.

The sleeve 16 carries a rubber buffer or gum bushing 21 with an adjusting nut 22 adapted to a seat in the suspension hanger 20 for the purpose of controlling the oscillation referred to until the machine automatically centers itself.

In the construction described all the bearings run continuously in an oil bath, the line of contact of the balls with their races lying outside of the inner edge of the flange 12 and the lower end 23 of the sleeve 16, the space between these being merely sufficient to provide a working clearance, thereby providing also a practically dust proof compartment for the bearings. In operation, centrifugal action keeps the oil from reaching this clearance to any extent. This compartment may be drained, however, by the removal of the plug 24.

The gum bushing 21 is located above the ball bearings and is therefore more effective in preventing wide oscillation of the spindle, than would be the case if it were located on the same plane. Furthermore it is also entirely free from any possible contact with the oil bath, in which the bearings run and is therefore not in position to be rotted by the action of such oil.

The term ball bearing is not intended to exclude roller bearings, so that the latter are intended to be embraced within the claims and description so far as they may be substituted for ball bearings.

What I claim is:

1. In a centrifugal separating machine the combination of a supporting spindle, a sleeve surrounding the lower end of same, ball bearings interposed between said spindle and sleeve, a driving pulley secured to said sleeve, and a solid rotating spindle depending from the sleeve, substantially as specified.

2. In a centrifugal separating machine the combination of a supporting spindle, a sleeve surrounding the same, ball bearings interposed between said spindle and sleeve, a driving pulley secured to said sleeve and a solid rotating spindle having an enlarged cup-like upper end, forming with the sleeve an oil reservoir in which the ball bearings are contained.

3. In a centrifugal separating machine the combination of a supporting hanger having a spherical seat and a buffer seat, a supporting spindle, a sleeve surrounding the lower end of said spindle, ball bearings interposed between said spindle and sleeve, a second sleeve or collar surrounding and secured to the upper end of said spindle and having a spherical projection adapted to said spherical seat, and an elastic buffer carried by said second sleeve and adapted to said buffer seat, substantially as described.

4. In a centrifugal separating machine the combination of a hanger, a solid supporting spindle, a ball joint and buffer interposed between the supporting spindle and hanger, a solid rotatable spindle provided with a cup-like end surrounding the end of the supporting spindle, and bearings arranged in the cup-like end and adapted to rotatably connect the adjacent ends of said spindles.

5. In a centrifugal separating machine the combination of a hanger, a supporting spindle, a ball joint and buffer interposed between the supporting spindle and hanger, a solid revoluble spindle arranged end to end and in line with the supporting spindle, and bearings for rotatably connecting the adjacent ends of said spindles and for insuring alinement thereof, substantially as described.

In testimony whereof I have hereunto signed my name.

JOHN PARKER.

Witnesses:
P. H. BRONET,
B. W. BEESLEY.